(12) United States Patent
Shih

(10) Patent No.: US 10,781,998 B1
(45) Date of Patent: Sep. 22, 2020

(54) LENS DEVICE

(71) Applicant: T.Y.C. BROTHER INDUSTRIAL CO., LTD., Tainan (TW)

(72) Inventor: Ming-Chih Shih, Tainan (TW)

(73) Assignee: T.Y.C. BROTHER INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 16/716,552

(22) Filed: Dec. 17, 2019

(51) Int. Cl.
*F21V 5/04* (2006.01)
*F21V 13/04* (2006.01)

(52) U.S. Cl.
CPC ............. *F21V 5/04* (2013.01); *F21V 13/04* (2013.01)

(58) Field of Classification Search
CPC .................................. F21V 5/04; F21V 13/04
See application file for complete search history.

(56) References Cited

U.S. PATENT DOCUMENTS

| | | | | |
|---|---|---|---|---|
| 2,215,900 A * | 9/1940 | Bitner | ......................... | F21V 5/04 362/309 |
| 2,224,178 A * | 12/1940 | Bitner | ......................... | F21V 5/04 362/337 |
| 2,254,961 A * | 9/1941 | Harris | ................... | F21V 7/0091 362/327 |
| 2,254,962 A * | 9/1941 | Bitner | ......................... | F21V 5/04 362/327 |
| 2,356,654 A * | 8/1944 | Cullman | ................. | F21V 13/04 362/223 |
| 5,757,557 A * | 5/1998 | Medvedev | .............. | F21L 4/027 359/708 |
| 6,547,423 B2 * | 4/2003 | Marshall | ................... | F21V 5/04 257/E33.072 |
| 6,814,470 B2 * | 11/2004 | Rizkin | ................ | F21V 21/0824 362/327 |
| 6,819,505 B1 * | 11/2004 | Cassarly | .................. | F21L 4/027 359/708 |
| 6,819,506 B1 * | 11/2004 | Taylor | ..................... | F21L 4/005 359/726 |
| 7,207,700 B2 * | 4/2007 | Fallahi | .................... | F21S 43/40 362/334 |
| 7,349,163 B2 * | 3/2008 | Angelini | .................. | F21K 9/68 359/708 |
| 7,461,960 B2 * | 12/2008 | Opolka | ................. | F21V 13/045 362/545 |
| 7,489,453 B2 * | 2/2009 | Chinniah | ............ | F21S 48/1233 359/718 |
| 7,744,246 B2 * | 6/2010 | Rizkin | .................... | F21V 5/046 362/245 |
| 7,901,098 B2 * | 3/2011 | Saitoh | .................... | G03B 15/05 362/16 |

(Continued)

*Primary Examiner* — William N Harris
(74) *Attorney, Agent, or Firm* — Burris Law, PLLC

(57) ABSTRACT

A lens device includes at least one optical lens which includes rear and front lens segments. The rear lens segment has a first refractive surface, a second refractive surface, and a reflective surface. The front lens segment has a convex lens front which defines a rear focal region. When light beams enter the optical lens through the second refractive surface and then are reflected by the reflective surface to form a plurality of reflected light beams, a plurality of second imaginary lines, extending rearwardly and respectively from the reflected light beams, converge at a second focal region overlapping with the rear focal region.

5 Claims, 18 Drawing Sheets

(56) References Cited

U.S. PATENT DOCUMENTS

| | | | |
|---|---|---|---|
| 8,579,472 B2* | 11/2013 | Koizumi | F21V 5/04 |
| | | | 362/308 |
| 9,574,734 B2* | 2/2017 | Sousek | F21S 43/14 |
| 2008/0100773 A1* | 5/2008 | Hwang | G02B 3/005 |
| | | | 349/62 |
| 2012/0120666 A1* | 5/2012 | Moeller | F21V 7/0091 |
| | | | 362/308 |
| 2015/0241616 A1* | 8/2015 | Bungenstock | F21S 43/26 |
| | | | 362/511 |
| 2017/0130923 A1* | 5/2017 | Nishimura | F21S 41/27 |
| 2018/0058666 A1* | 3/2018 | Huang | F21V 14/06 |

\* cited by examiner

LENS DEVICE

FIELD

The disclosure relates to a lens device, more particularly to a lens device for distribution of light beams from a light emitter.

BACKGROUND

As shown in FIG. 1, a conventional vehicle lighting assembly may include at least one optical lens 1 and a light emitter 11 which is disposed rearwardly of the optical lens 1 and which has an emitter axis 14 in a front-rear direction. The optical lens 1 includes a rear lens segment 12 and a front lens segment 13.

The rear lens segment 12 has a recess 120 and a reflective surface 122. The recess 120 extends forwardly from a rear end 124 of the rear lens segment 12 along the emitter axis 14 to terminate at a first refractive surface 121. The recess 120 has a second refractive surface 123 which extends in the front-rear direction to interconnect the rear end 124 and the first refractive surface 121, and which extends circumferentially to surround the emitter axis 14. The reflective surface 122 diverges forwardly from an outer periphery of the rear end 124 to surround the emitter axis 14 and to form an outer peripheral surface of the rear lens segment 12. The front lens segment 13 extends forwardly from the rear lens segment 12 along the emitter axis 14 to terminate at a lens front 131 with a flat profile.

The light beams from the light emitter 11 entering the optical lens 1 through the first refractive surface 121 may leave the optical lens 1 from the lens front 131. The light beams from the light emitter 11 entering the optical lens 1 through the second refractive surface 123 may be reflected by the reflective surface 122 and then may leave the optical lens 1 through the lens front 131. The outputted light beams from the optical lens 1 may have a light distribution pattern shown in FIG. 2.

Recently, it is required for the lens front 131 of the optical lens 1 to have a convex profile. There is thus a need to provide an optical lens with a convex lens front, and from which the outputted light beams have a light distribution pattern similar to that shown in FIG. 2.

SUMMARY

Therefore, an object of the disclosure is to provide a novel lens device which has at least one optical lens with a convex lens front. The outputted light beams from the novel lens device may have a light distribution pattern similar to that shown in FIG. 2.

According to the disclosure, a lens device is provided for directing light beams from a light emitter which has an emitter axis in a front-rear direction. The lens device includes at least one optical lens which includes a rear lens segment and a front lens segment. The rear lens segment has a recess and a reflective surface. The recess extends forwardly from a rear end of the rear lens segment along the emitter axis to terminate at a first refractive surface. The recess has a second refractive surface which extends in the front-rear direction to interconnect the rear end and the first refractive surface, and which extends circumferentially to surround the emitter axis. The reflective surface diverges forwardly from an outer periphery of the rear end to surround the emitter axis and to form an outer peripheral surface of the rear lens segment. The front lens segment extends forwardly from the rear lens segment along the emitter axis to terminate at a convex lens front which defines a rear focal region located rearwardly of the rear lens segment. The first refractive surface is configured such that when the light beams from the light emitter enter the optical lens through the first refractive surface to form a plurality of first refracted light beams in the optical lens, a plurality of first imaginary lines, which extend rearwardly and respectively from the first refracted light beams, converge at a first focal region. The second refractive surface and the reflective surface are configured such that when the light beams from the light emitter enter the optical lens through the second refractive surface and then are reflected by the reflective surface to form a plurality of reflected light beams, a plurality of second imaginary lines, which extend rearwardly and respectively from the reflected light beams, converge at a second focal region overlapping with the rear focal region.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
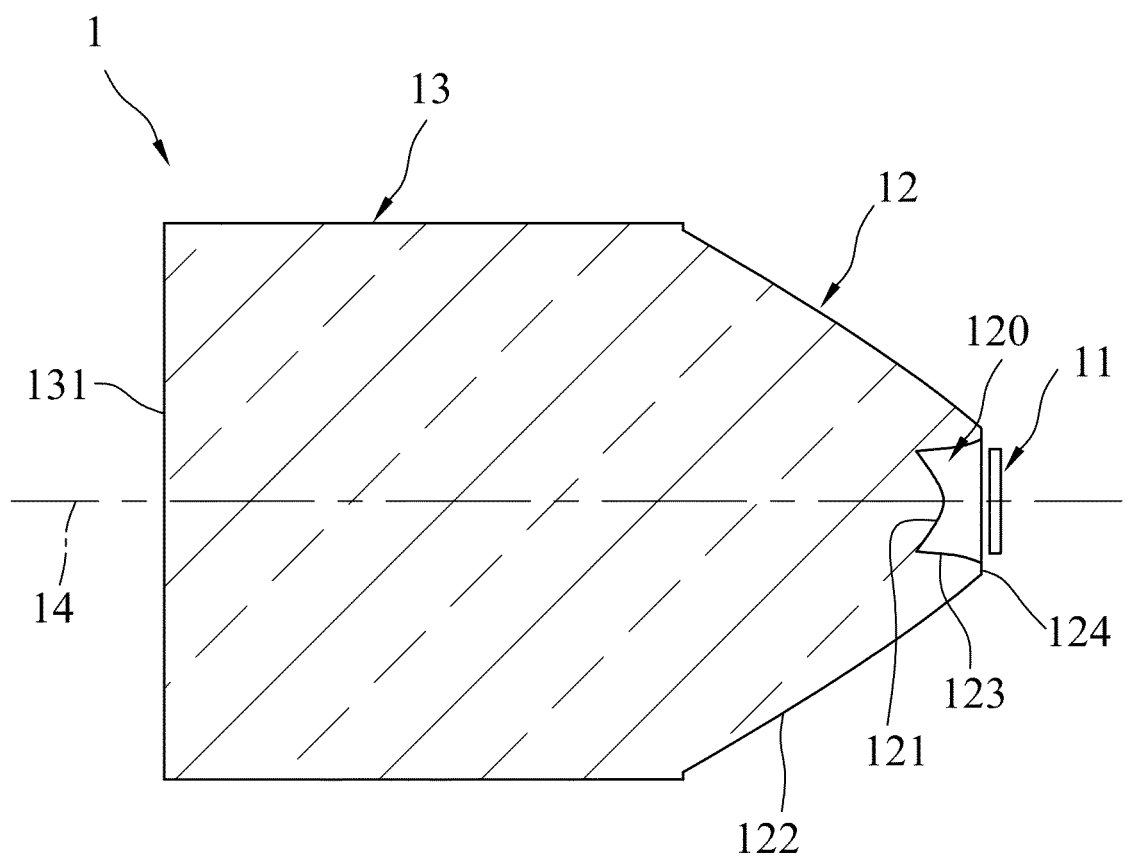
FIG. 1 is a partially cross-sectional view illustrating a conventional vehicle lighting assembly.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 3:
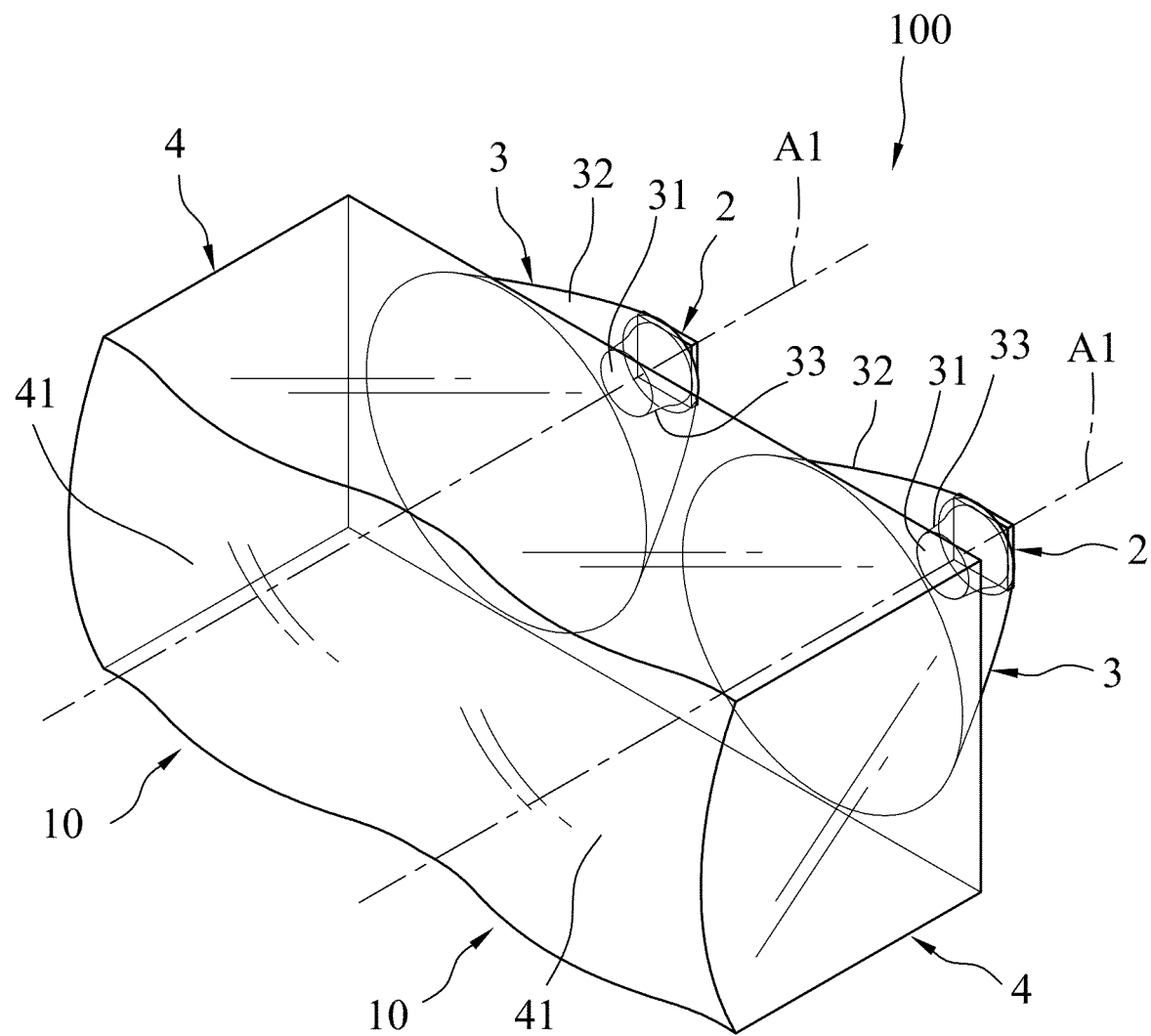
FIG. 3 is a front perspective view of a lighting assembly according to a first embodiment of the disclosure.
Figure 4:
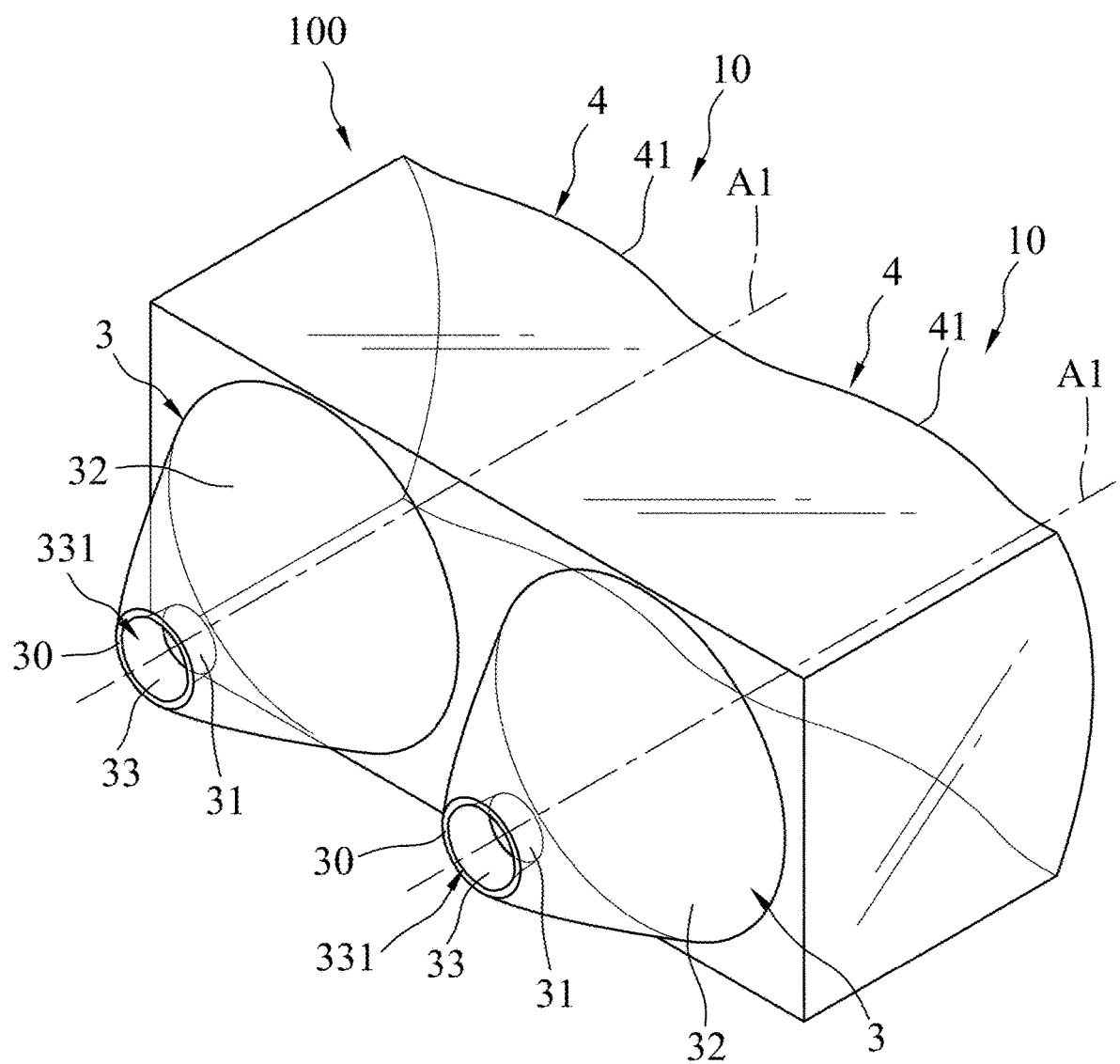
FIG. 4 is a rear perspective view of the first embodiment in which light emitters are omitted.

Referring to FIGS. 3 and 4, a lighting assembly according to a first embodiment of the disclosure is shown to include a lens device 100 and at least one light emitter 2. The lens device 100 is provided for directing light beams from the light emitter 2 and includes at least one optical lens 10 which includes a rear lens segment 3 and a front lens segment 4. The light emitter 2 has an emitter axis (A1) in a front-rear direction (Z). In an embodiment, the light emitter 2 may be a light-emitting diode chip, and the emitter axis (A1) may also serve as a symmetrical axis of the rear lens segment 3 of the optical lens 10.

Figure 5:
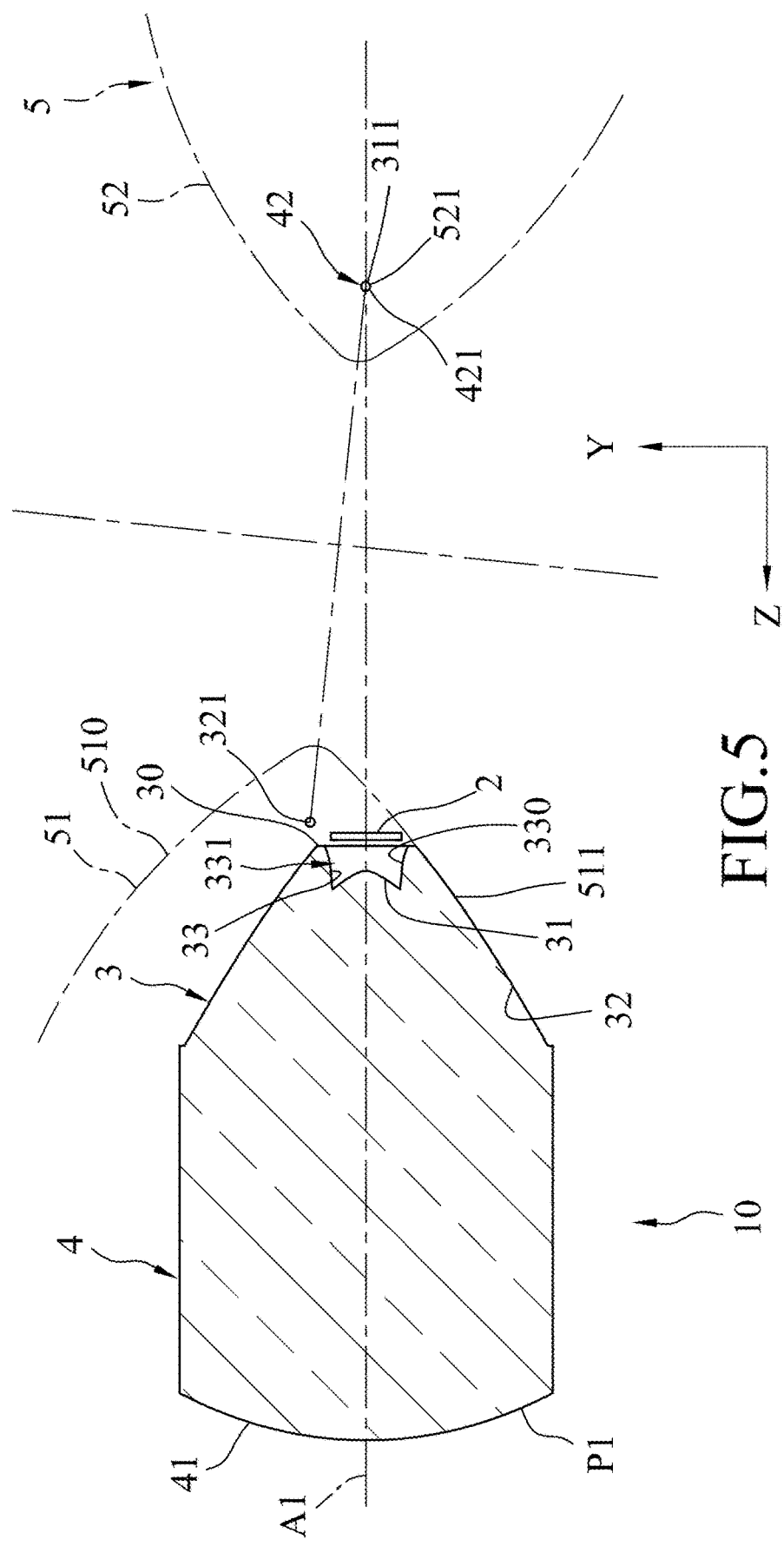
FIG. 5 is a partially cross-sectional view taken in the YZ plane of the first embodiment.

As shown in FIGS. 4 and 5, the rear lens segment 3 has a recess 331 and a reflective surface 32. The recess 331 extends forwardly from a rear end 30 of the rear lens segment 3 along the emitter axis (A1) to terminate at a first refractive surface 31. The recess 331 has a second refractive surface 33 which extends in the front-rear direction (Z) to interconnect the rear end 30 and the first refractive surface 31, and which extends circumferentially to surround the emitter axis (A1). The reflective surface 32 diverges forwardly from an outer periphery of the rear end 30 to surround the emitter axis (A1) and to form an outer peripheral surface of the rear lens segment 3.

The front lens segment 4 extends forwardly from the rear lens segment 3 along the emitter axis (A1) to terminate at a convex lens front 41 which defines a rear focal region 42 that is located rearwardly of the rear lens segment 3.

Figure 7:
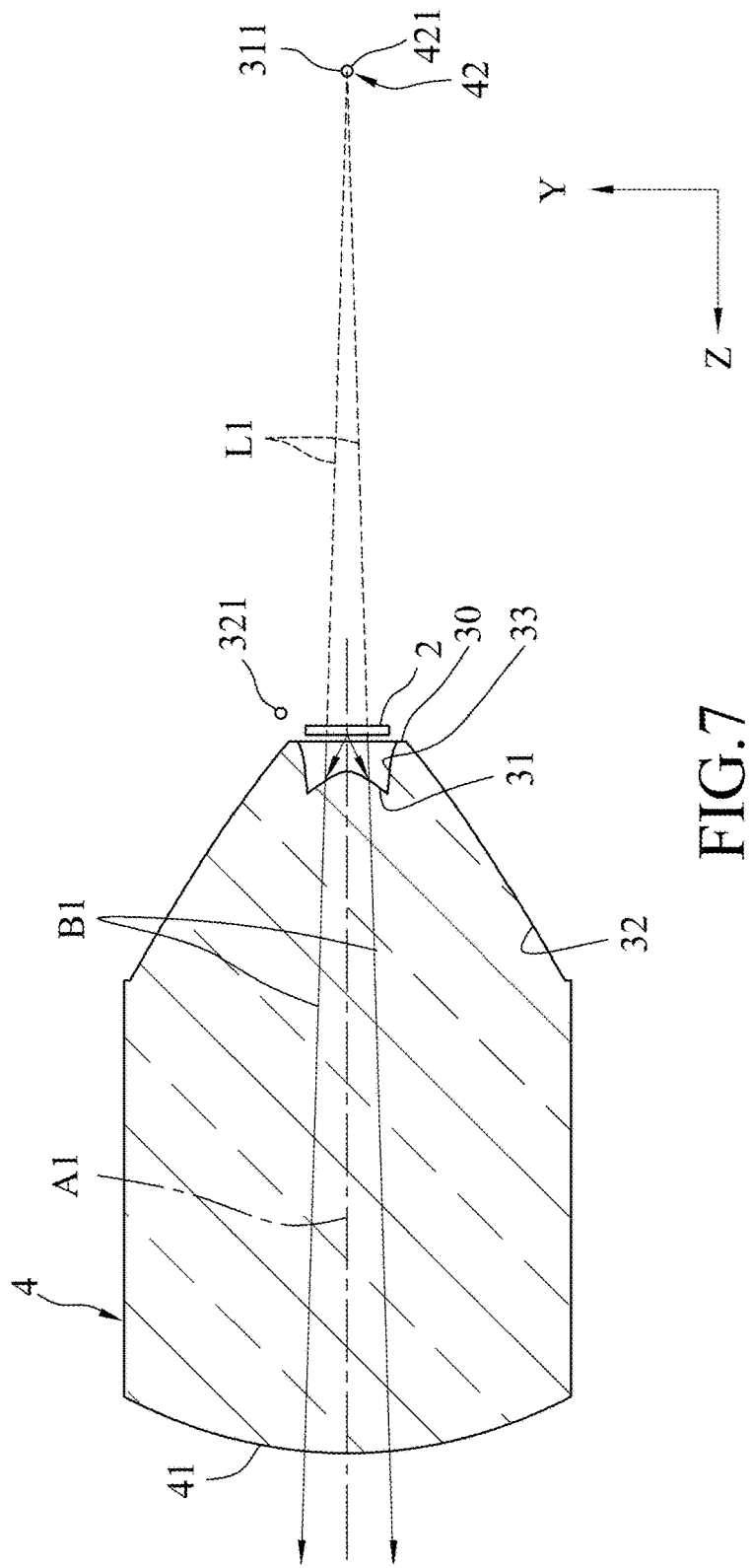
FIG. 7 is similar to FIG. 5 but is further illustrated with light beams from a light emitter entering an optical lens through a first refractive surface.

As shown in FIG. 7, the first refractive surface 31 is configured such that when the light beams from the light emitter 2 enter the optical lens 10 through the first refractive surface 31 to form a plurality of first refracted light beams (B1) in the optical lens 10, a plurality of first imaginary lines (L1), which extend rearwardly and respectively from the first refracted light beams (B1), converge at a first focal region 311 overlapping with the rear focal region 42.

Figure 9:
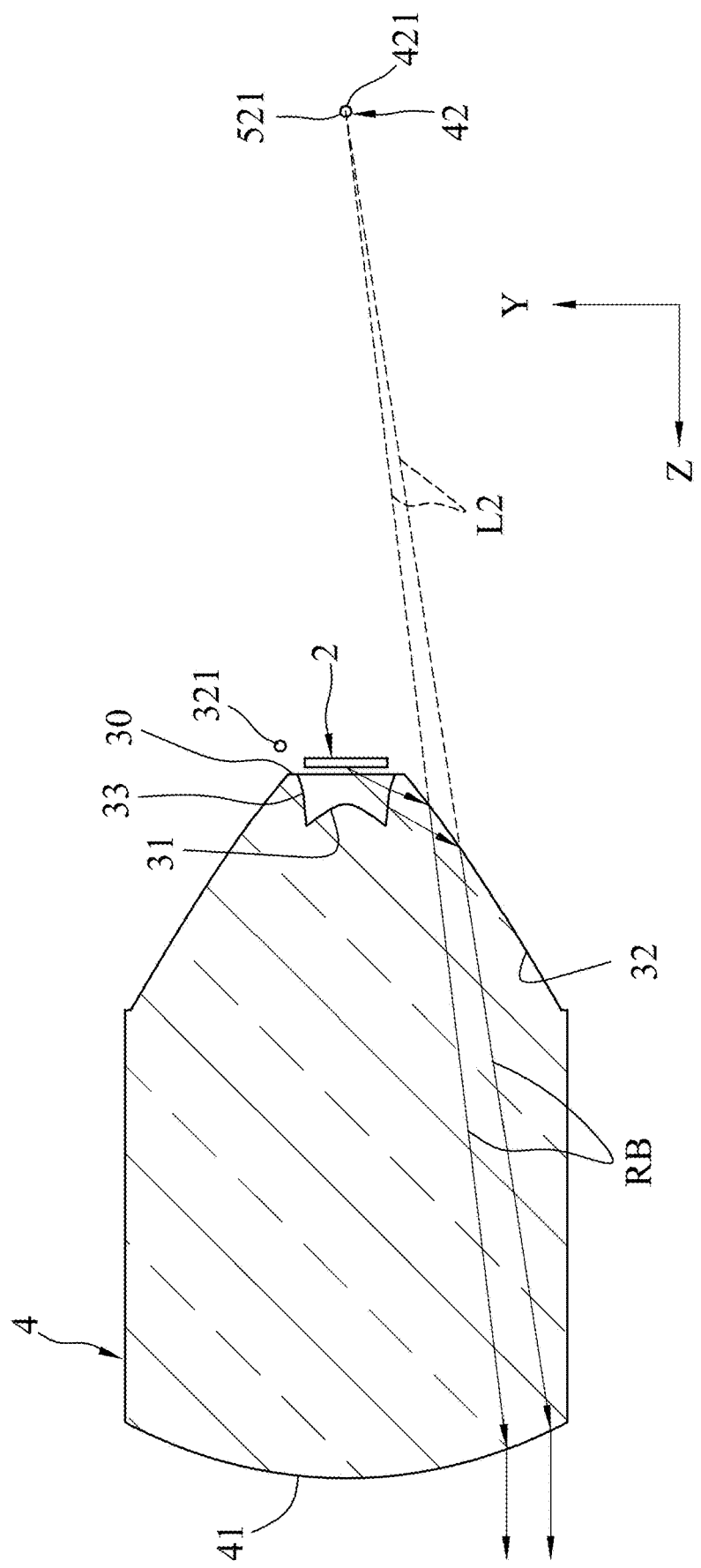
FIG. 9 is similar to FIG. 8 but is further illustrated with the light beams, refracted by the second refractive surface, being further reflected by a reflective surface.

As shown in FIG. 9, the second refractive surface 33 and the reflective surface 32 are configured such that when the light beams from the light emitter 2 enter the optical lens 10 through the second refractive surface 33 and then are reflected by the reflective surface 32 to form a plurality of reflected light beams (RB), a plurality of second imaginary lines (L2), which extend rearwardly and respectively from the reflected light beams (RB), converge at a second focal region 521 overlapping with the rear focal region 42.

Figure 8:
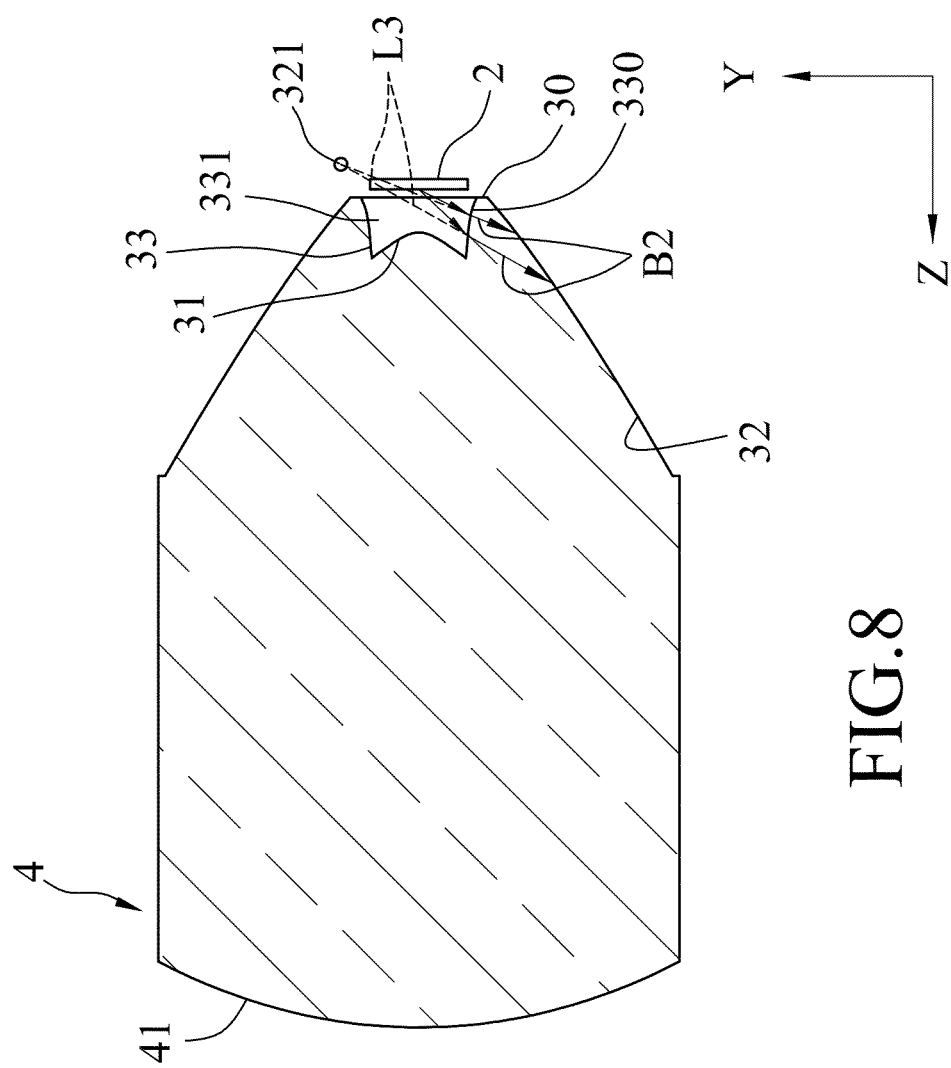
FIG. 8 is similar to FIG. 7 but is further illustrated with the light beams from the light emitter entering the optical lens through a second refractive surface.

In an embodiment shown in FIGS. 5 and 8, the rear focal region 42 has a rear focal point 421 on the emitter axis (A1). The second refractive surface 33 has a selected region 330 such that when the light beams from the light emitter 2 enter the optical lens 10 through the selected region 330 of the second refractive surface 33 to form a plurality of second refracted light beams (B2) in the optical lens 10, a plurality of third imaginary lines (L3), which extend rearwardly and respectively from the second refracted light beams (B2), converge at a third focal point 321.

Furthermore, the third focal point 321 and the rear focal point 421 of the rear focal region 42 cooperatively define a hyperbola 5 (see FIG. 5). The hyperbola 5 has a distal branch 52 and a proximal branch 51 relative to the third focal point 321. The proximal branch 51 has a distal arm 510 and a proximal arm 511 relative to the selected region 330 of the second refractive surface 33. The reflective surface 32 is formed by rotating the proximal arm 511 about the emitter axis (A1).

Figure 6:
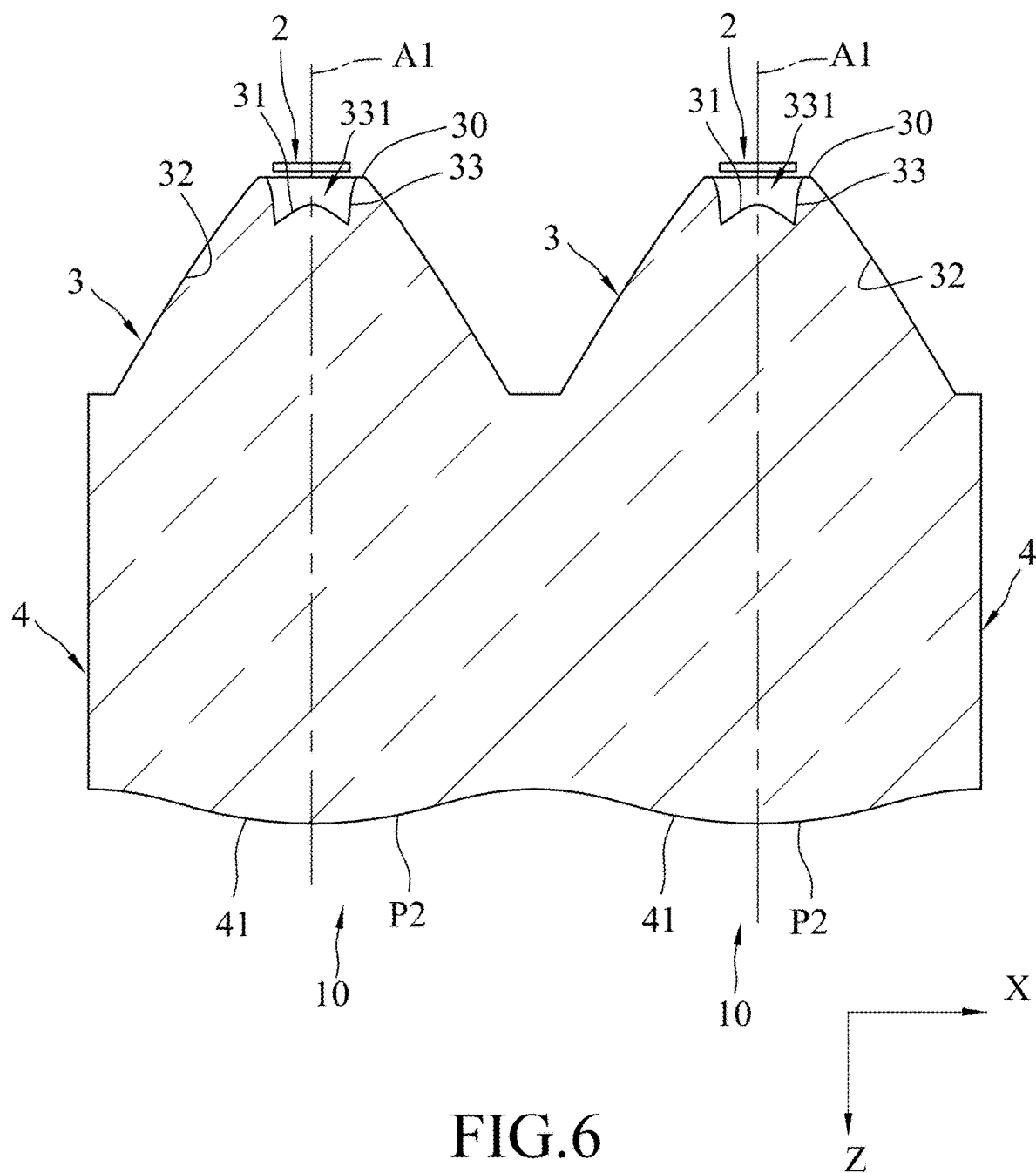
FIG. 6 is another partially cross-sectional view taken in the XZ plane of the first embodiment.

In an embodiment shown in FIGS. 3, 5, and 6, the convex lens front 41 is a dome-shaped convex surface such that the rear focal region 42 is in the shape of a point at the rear focal point 421. In this case, the convex lens front 41 has a curved profile line (P1) in the YZ plane (see FIG. 5) and a curved profile line (P2) in the XZ plane (see FIG. 6).

Figure 10:
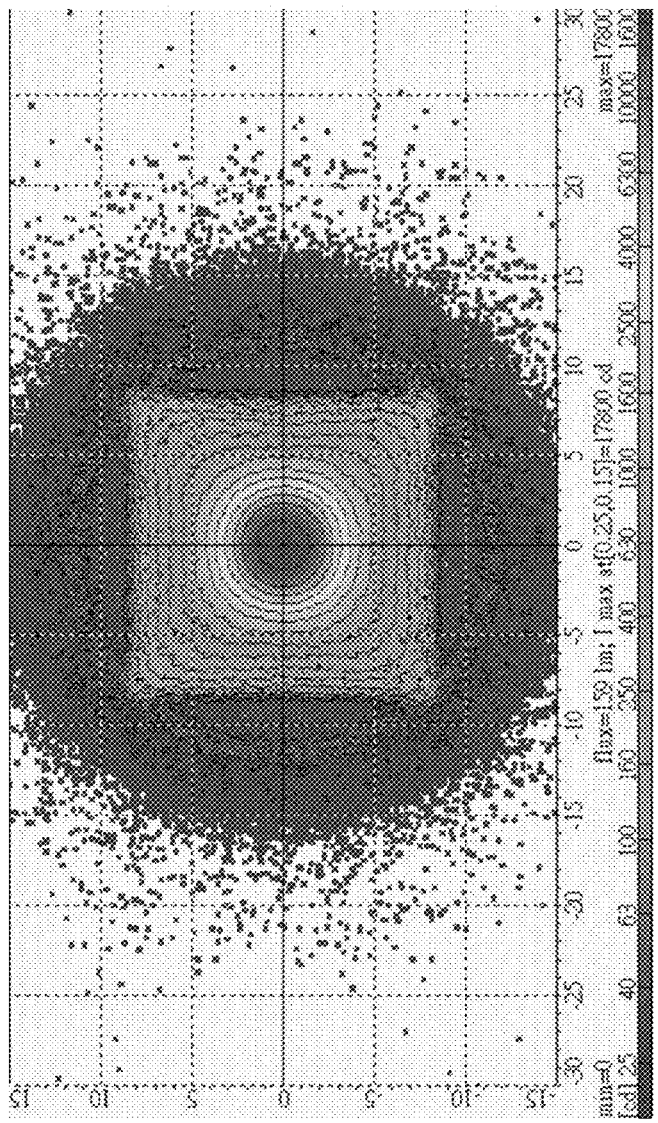
FIG. 10 is a light distribution pattern of the light beams outputted from one of the optical lenses in the first embodiment.

In an embodiment shown in FIGS. 5, 7, and 9, each of the first and second focal regions 311, 521 is in the form of a point, and fully overlaps with the rear focal point 421. When a point of the light emitter 2 on the emitter axis (A1) has the coordinate (0,0,0) of an XYZ three-dimensional coordinate system, the coordinate of each of the first and second focal regions 311, 521 and the rear focal point 421 is (0,0,−20). In the xyz three-dimensional coordinate system, a unit is mm, and the x, y, z axes in the three-dimensional coordinate system are respectively in the X, Y, Z directions shown in FIGS. 3 to 9. Please note that when each of the first and second focal regions 311, 521 fully overlaps with the rear focal point 421, the output light beams from the convex lens front 41 of the optical lens 10 are most likely substantially parallel to each other (see FIGS. 7 and 9) and may have a light distribution pattern (FIG. 10) similar to that shown in FIG. 2.

In a non-shown embodiment, each of the first and second focal regions 311, 521 and the rear focal region 42 may be in the shape of a ball having a diameter ranging from 3 mm to 5 mm. Each of the first and second focal regions 311, 521 may partially or fully overlap with the rear focal region 42.

In an embodiment shown in FIGS. 3, 4, and 6, the lighting assembly may include two of the light emitter 2 and the lens device 100 may include two of the optical lens 10. The front lens segments 4 of the optical lens 10 are integrally connected in the left-right direction (X).

Figure 11:
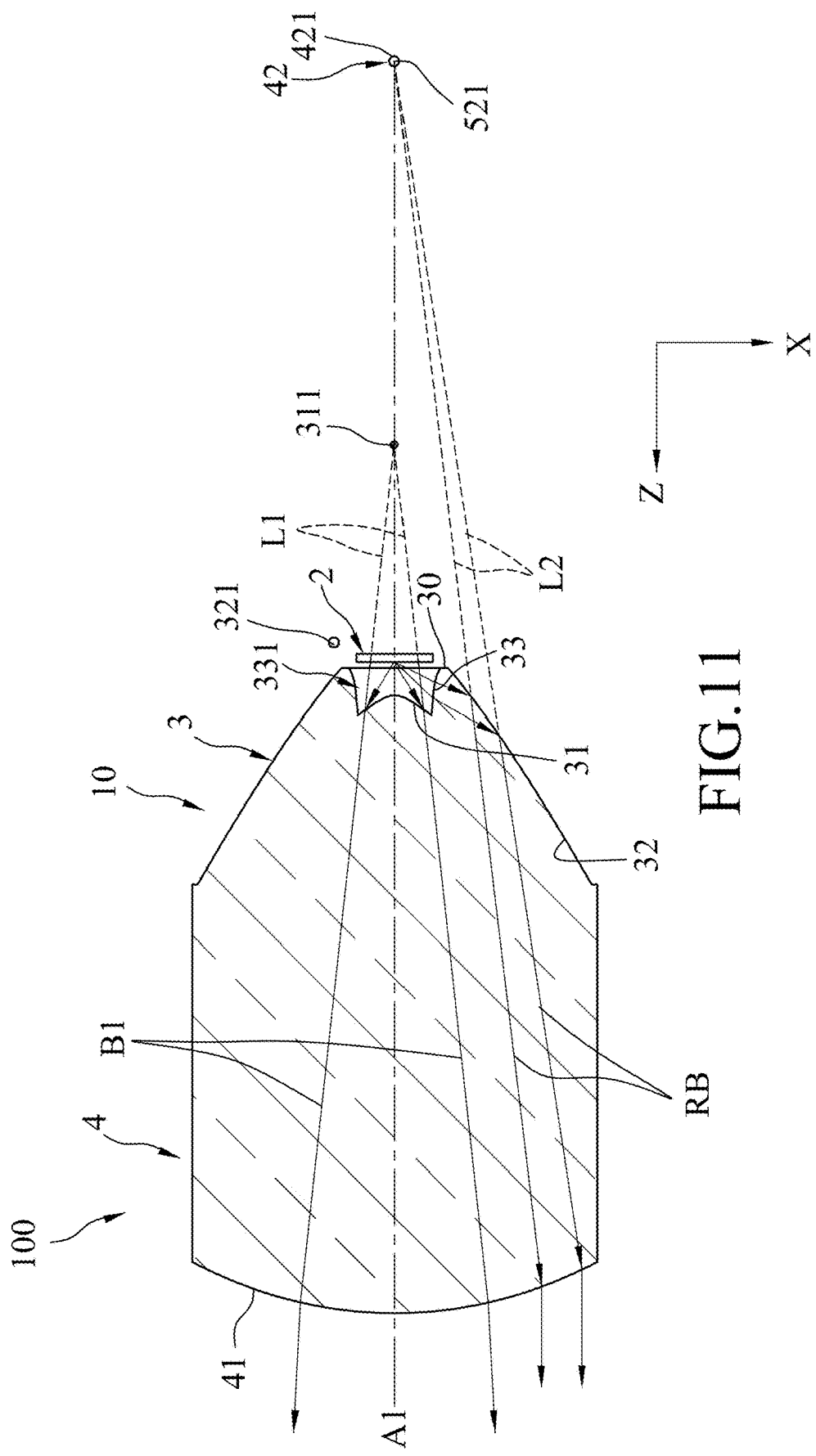
FIG. 11 is a partially cross-sectional view taken in the XZ plane of a lighting assembly according to a second embodiment of the disclosure.
Figure 12:
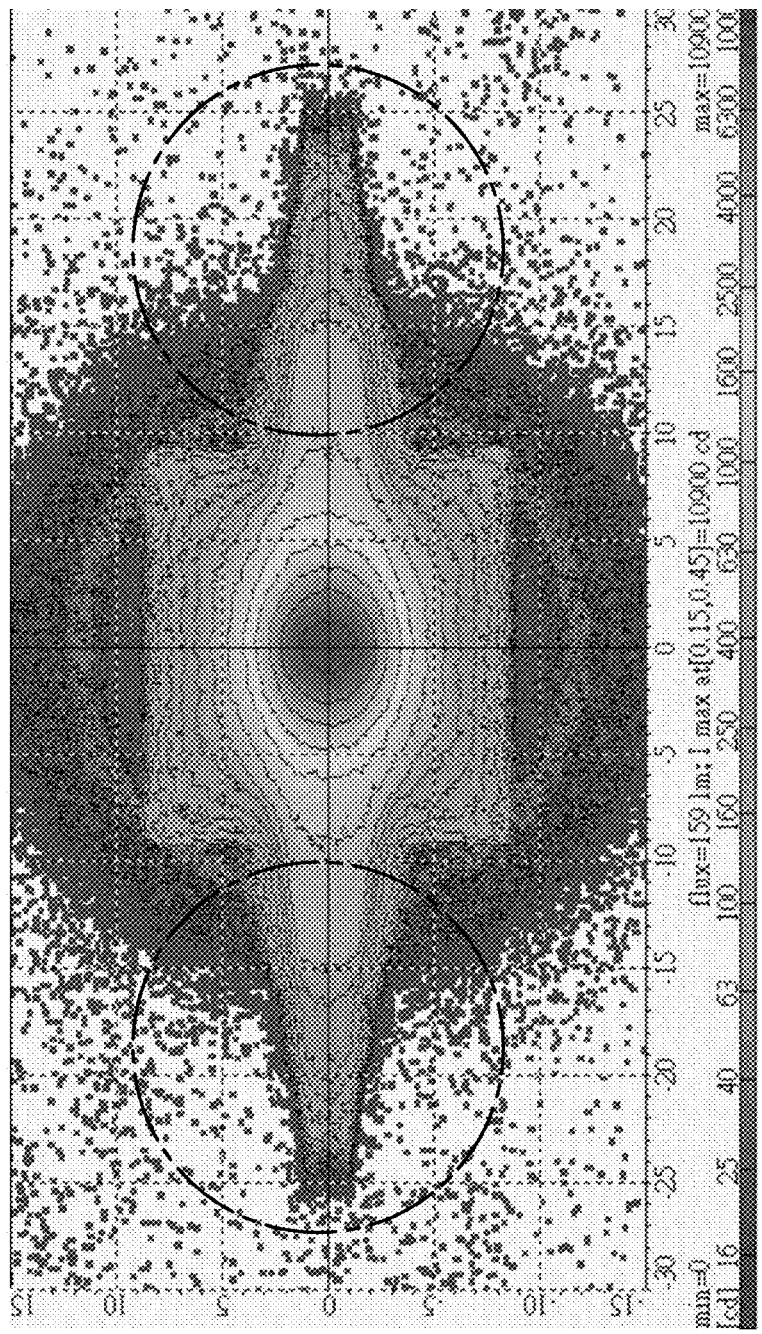
FIG. 12 is a light distribution pattern of the light beams outputted from the second embodiment.

FIG. 11 illustrates a lighting assembly according to a second embodiment of the disclosure. The second embodiment is similar to the first embodiment except that in the second embodiment, the lens device 100 includes a single optical lens 10, and the first focal region 311 is located in front of the rear focal region 42. It can be found that when only the second focal region 521 overlaps with the rear focal region 42, the output light beams from the convex lens front 41 of the optical lens 10 may have a light distribution pattern (FIG. 12) which includes a central portion similar to the light distribution pattern shown in FIG. 2, and two additional lateral portions (marked respectively by two imaginary circles).

FIGS. 13 to 17 illustrate a lighting assembly according to a third embodiment of the disclosure. The third embodiment is similar to the first embodiment except that in the third embodiment, the convex lens front 41 is an arch-shaped convex surface such that the rear focal region 42 is in the shape of a line in a left-right direction (X). The line 42 intersects the emitter axis (A1) at the rear focal point 421. In this case, the convex lens front 41 has a curved profile line (P3) in the YZ plane (see FIG. 14), and a straight profile line (P4) in the XZ plane (see FIG. 15).

Figure 13:
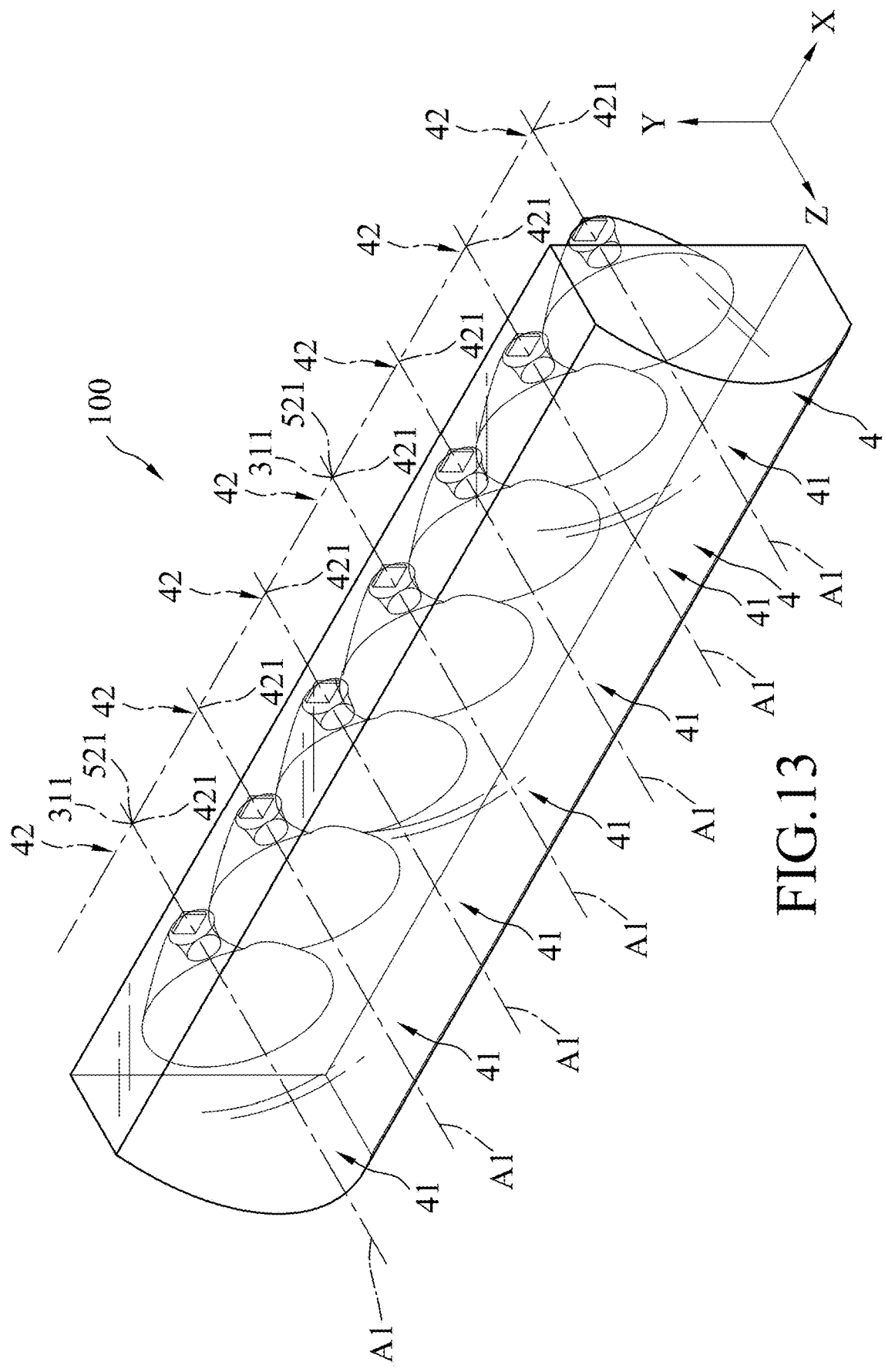
FIG. 13 is a perspective view of a lighting assembly according to a third embodiment of the disclosure.
Figure 14:
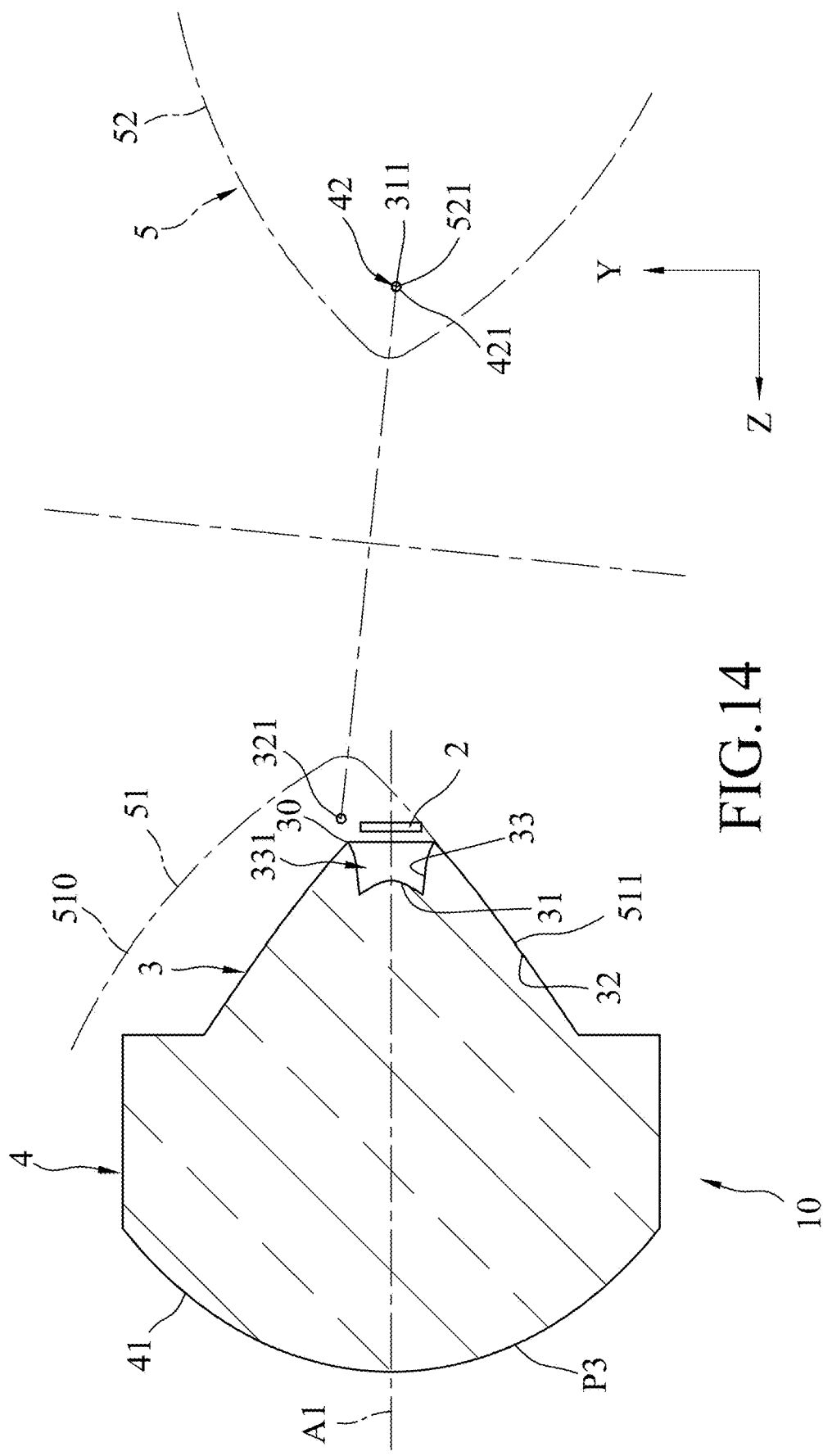
FIG. 14 is a partially cross-sectional view taken in the YZ plane of the third embodiment.
Figure 15:
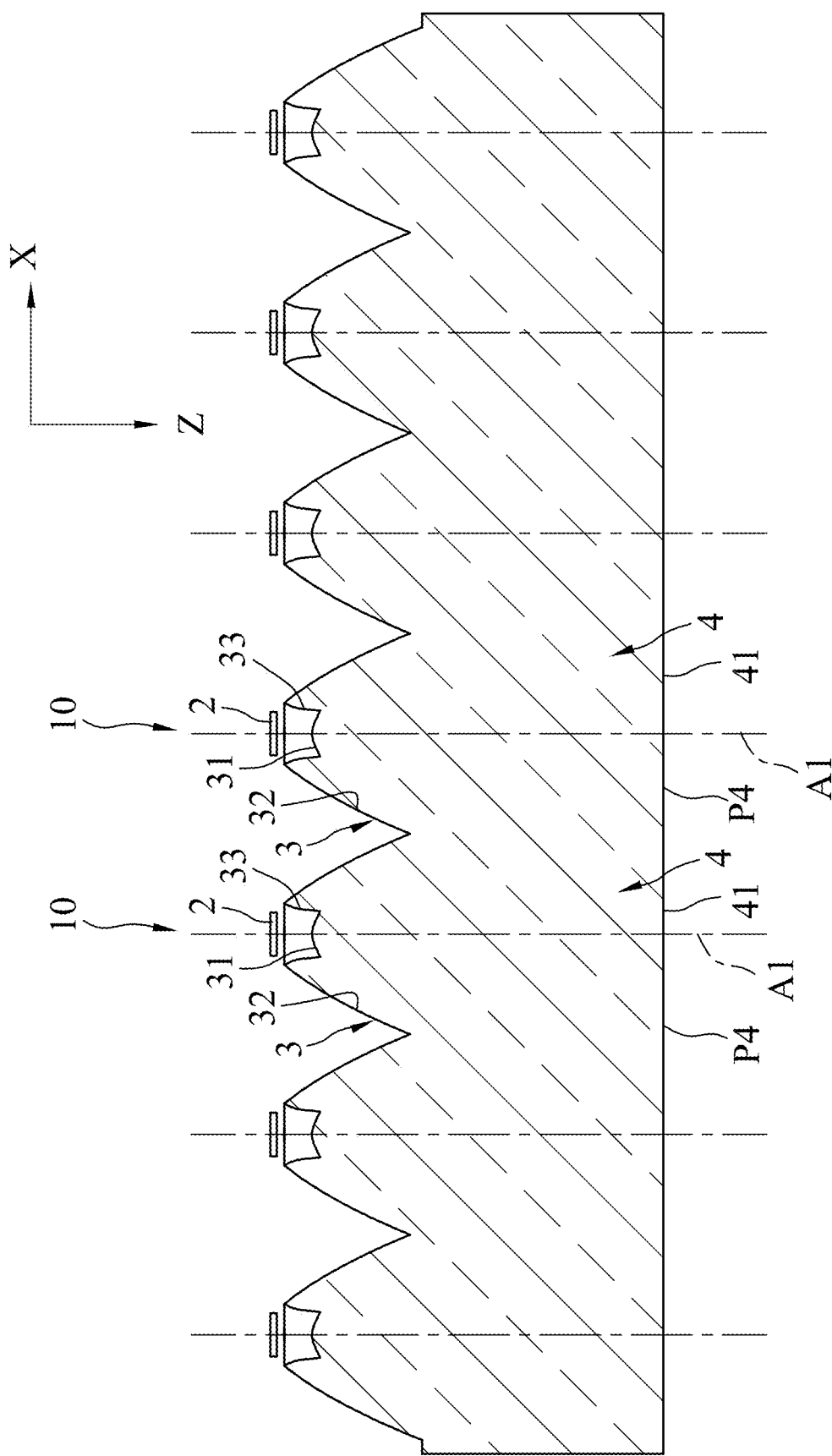
FIG. 15 is another partially cross-sectional view taken in the XZ plane of the third embodiment.
Figure 16:
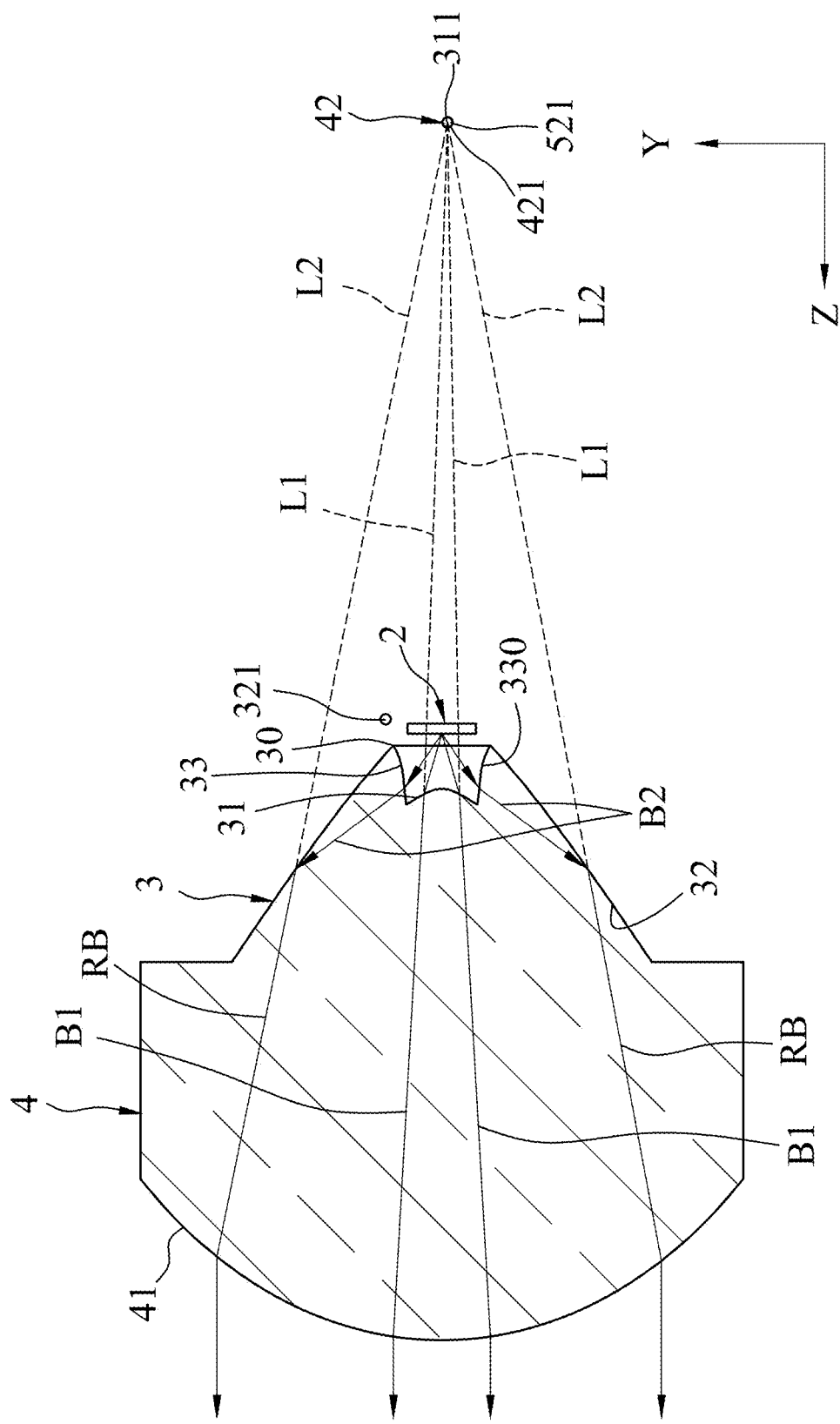
FIG. 16 is similar to FIG. 14 but is further illustrated with paths of the light beams in the YZ plane.
Figure 17:
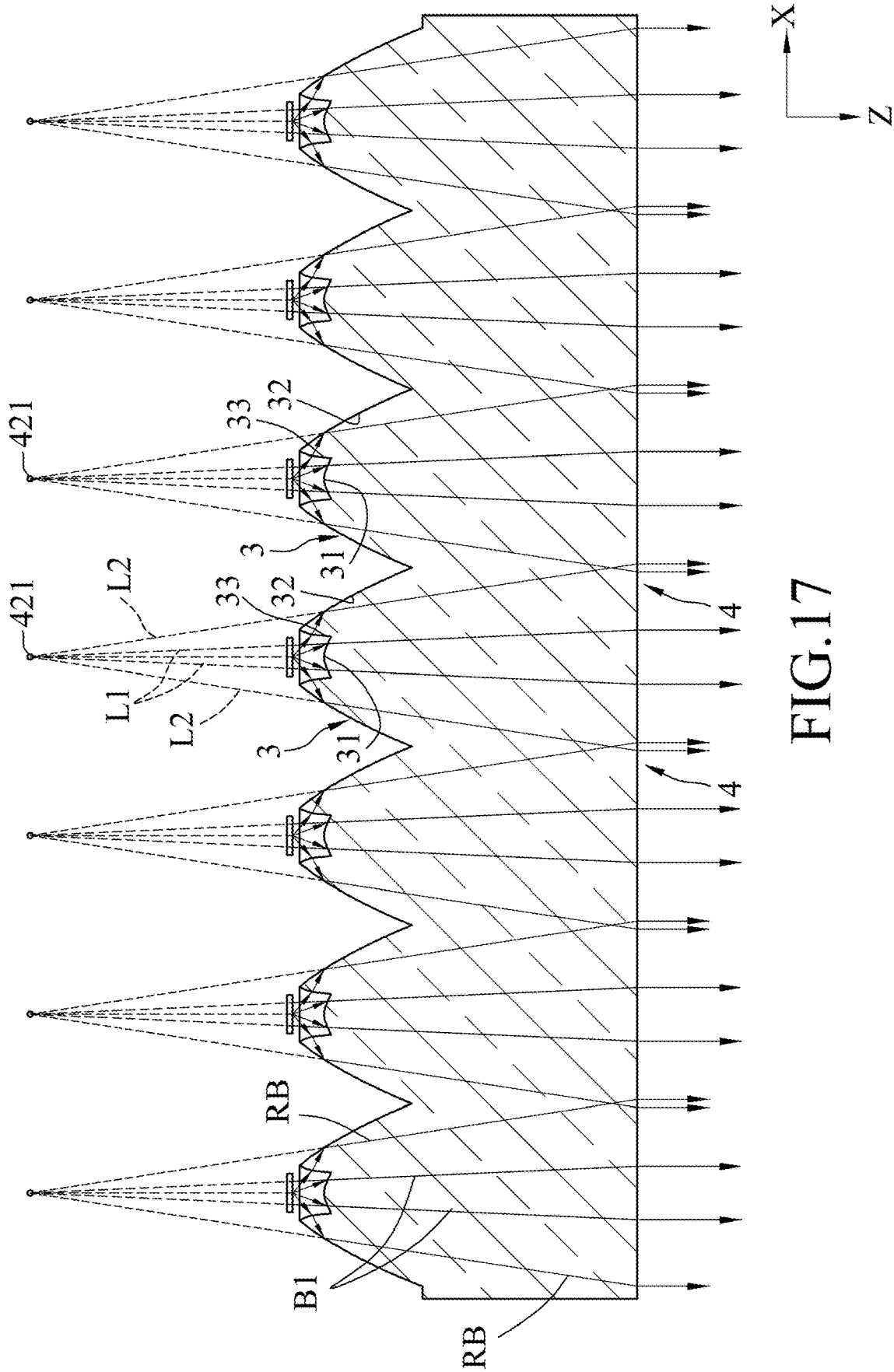
FIG. 17 is similar to FIG. 15 but is further illustrated with paths of the light beams in the XZ plane.

In an embodiment shown in FIG. 13, each of the first and second focal regions 311, 521 is in the form of a point, and fully overlaps with the rear focal point 421.

In an embodiment shown in FIGS. 13 to 17, the lens device 100 may include a plurality of the optical lenses in which the front lens segments 4 thereof are integrally connected in the left-right direction (X).

Figure 2:
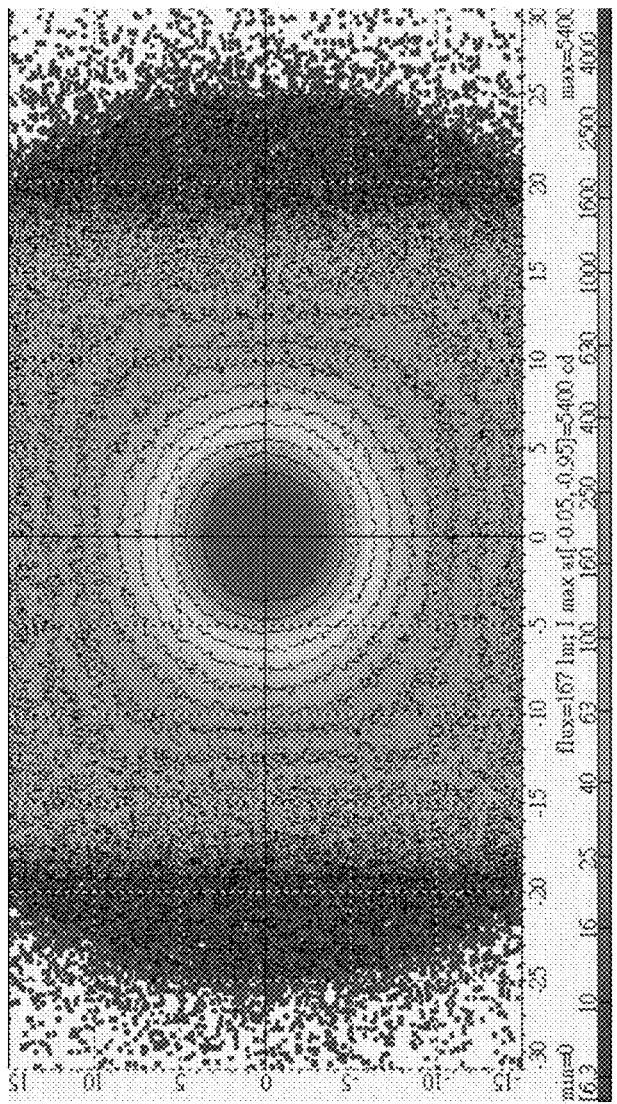
FIG. 2 is a light distribution pattern of light beams outputted from the conventional vehicle lighting assembly.
Figure 18:
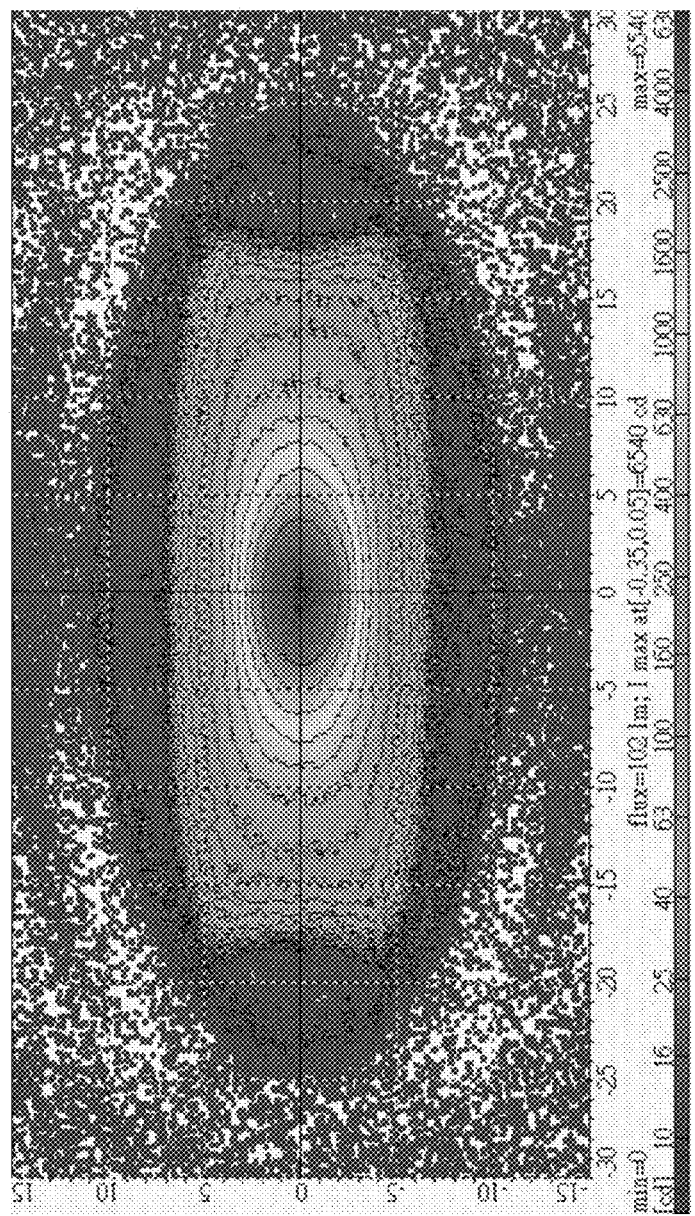
FIG. 18 is a light distribution pattern of the light beams outputted from one of optical lenses in the third embodiment.

As shown in FIG. 18, the output light beams from the convex lens front 41 of the optical lens 10 may have a light distribution pattern similar to the light distribution pattern shown in FIG. 2.

In sum, when at least the second focal region 521 is devised to overlap with the rear focal region 42, each optical lens 10 with the convex lens front 41 may have a light distribution pattern similar to the light distribution pattern of the conventional optical lens with a flat lens front.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A lens device for directing light beams from a light emitter which has an emitter axis in a front-rear direction, said lens device comprising at least one optical lens which includes a rear lens segment having
a recess extending forwardly from a rear end of said rear lens segment along the emitter axis to terminate at a first refractive surface, said recess having a second refractive surface which extends in the front-rear direction to interconnect said rear end and said first refractive surface, and which extends circumferentially to surround the emitter axis, and a reflective surface diverging forwardly from an outer periphery of said rear end to surround the emitter axis and to form an outer peripheral surface of said rear lens segment; and a front lens segment extending forwardly from said rear lens segment along the emitter axis to terminate at a convex lens front which defines a rear focal region that is located rearwardly of said rear lens segment, wherein said first refractive surface is configured such that when the light beams from the light emitter enter said optical lens through said first refractive surface to form a plurality of first refracted light beams in said optical lens, a plurality of first imaginary lines, which extend rearwardly and respectively from the first refracted light beams, converge at a first focal region;

wherein said second refractive surface and said reflective surface are configured such that when the light beams from the light emitter enter said optical lens through said second refractive surface and then are reflected by said reflective surface to form a plurality of reflected light beams, a plurality of second imaginary lines, which extend rearwardly and respectively from the reflected light beams, converge at a second focal region overlapping with said rear focal region;

wherein said first focal region overlaps with said rear focal region;

wherein said rear focal region has a rear focal point on the emitter axis;

wherein said second refractive surface has a selected region such that when the light beams from the light emitter enter said optical lens through said selected region of said second refractive surface to form a plurality of second refracted light beams in said optical lens, a plurality of third imaginary lines, which extend rearwardly and respectively from the second refracted light beams, converge at a third focal point;

wherein said third focal point and said rear focal point of said rear focal region cooperatively define a hyperbola which has a distal branch and a proximal branch relative to said third focal point, the proximal branch having a distal arm and a proximal arm relative to said selected region of said second refractive surface; and wherein said reflective surface is formed by rotating the proximal arm about the emitter axis.

2. The lens device according to claim 1, wherein said convex lens front is a dome-shaped convex surface such that said rear focal region is in a shape of a point or a ball at said rear focal point.

3. The lens device according to claim 2, wherein each of said first and second focal regions is in a form of a point, and fully overlaps with said rear focal point.

4. The lens device according to claim 1, wherein said convex lens front is an arch-shaped convex surface such that said rear focal region is in a shape of a line in a left-right direction, and said line intersects the emitter axis at said rear focal point.

5. The lens device according to claim 4, wherein each of said first and second focal regions is in a form of a point, and fully overlaps with said rear focal point.

* * * * *